(Model.)
W. WARD.
DIE FOR MAKING TURN BUCKLES.
No. 256,256. Patented Apr. 11, 1882.
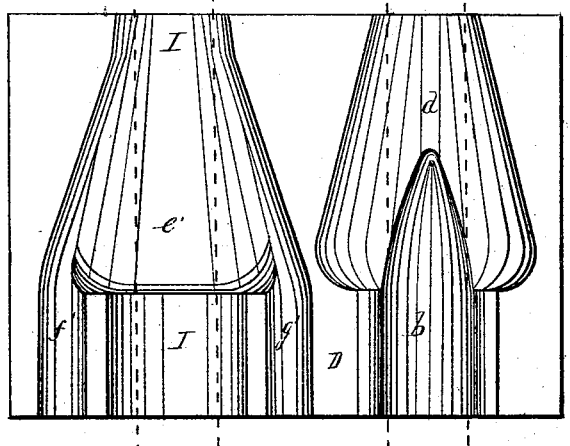
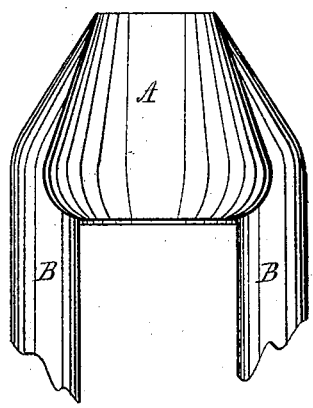
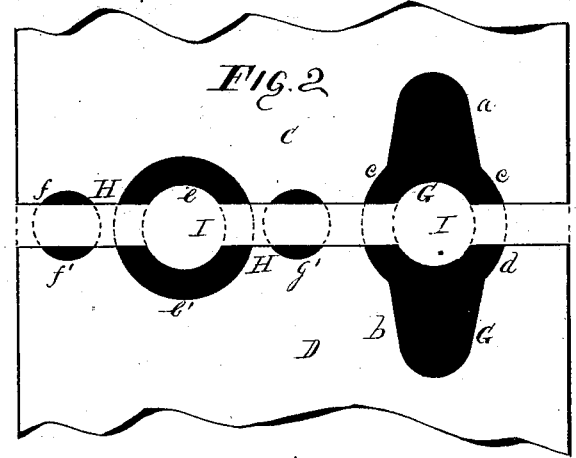
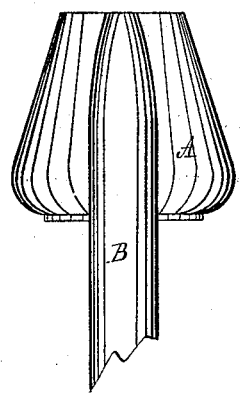
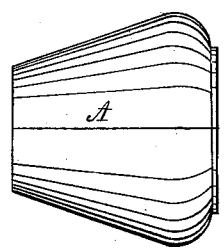
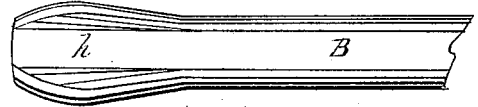
Witnesses.
Inventor.

UNITED STATES PATENT OFFICE.

WILLIAM WARD, OF CLEVELAND, OHIO.

DIE FOR MAKING TURN-BUCKLES.

SPECIFICATION forming part of Letters Patent No. 256,256, dated April 11, 1882.

Application filed March 15, 1881. (Model.)

*To all whom it may concern:*

Be it known that I, WILLIAM WARD, of Cleveland, county of Cuyahoga, and State of Ohio, have invented certain Improved Dies or Mechanism for Making Turn-Buckles, which dies are arranged in sets or pairs, so that the head and side bars may be welded together and shaped at one operation, each head, with its side bars or links, being welded and forged into shape separately by means of the dies, as hereinafter more fully set forth.

To enable others skilled in the art to understand the construction and operation of the said mechanism, I will proceed to describe the same, reference being had to the following specification and annexed drawings, making part thereof.

Figure 1 is a top view of one-half of a pair or set of dies; Fig. 2, an end view of the dies; Fig. 3, a side view of one end of turn-buckle, showing the head and side bars in section. Fig. 4 is an edge view of Fig. 3. Figs. 5 and 6 will be referred to in description hereinafter.

Like letters refer to like parts in the several drawings.

In the ordinary way of forging turn-buckles the head is worked out from a piece of iron or steel and bent around a mandrel to form the eye, or forged out solid and then drilled to form the eye. The two ends of the head-piece are then scarfed and welded together, making the head; next a bar is scarfed and welded to the side of the head, and another is prepared in the same way and welded to the opposite side, thus forming one end of the article. The other end is then made by scarfing the opposite ends of the bars, (if not done before,) adjusting them to a second head, and then welding the bars and head together, which is done by ordinary hammering or forging. Thus the two heads are shaped and welded to the bars essentially in the same way, which requires six welding-heats to be taken in making the turn-buckle after the pieces for the heads and the side bars have been previously forged into shape for welding together. When the article is forged out in this way much more labor and skill is required than when made by the dies before mentioned, and by means of which the article is superior in finish and quality. To avoid this labor, expense, and expertness in making turn-buckles, I use the said dies, which consist of two sets or pairs, as seen in Figs. 1 and 2.

The head A, Fig. 5, of the article is first roughed out from a suitable piece of metal and bent or turned over a mandrel to form the eye. The two ends of the piece abut together. Then the ends of the side bars, B B, are adjusted to each side of the head opposite to each other and held in place by proper means for welding together. The head and ends of the bars are then placed in a furnace or forge and heated to a welding degree, in which condition it is withdrawn from the fire and placed between the blocks C D, with a cold mandrel in the eye of the head, in such way that one of the bars B will be in the cavity $a$ and the other in the cavity $b$, with one side of the head in the recess $c$ and the other in the recess $d$, in which position the two ends of the head-piece are arranged to be in the space between the upper and lower blocks, the lower one, D, being secured to an anvil or base, and the upper one, C, to the hammer operated by any suitable motor or power. The force of the blows from the upper block, acting in conjunction with the dies therein and in the lower block, compresses and welds the bars to the head and the abutting ends of the head-piece, thus shaping the head, welding it and bars together at one heat and one operation. The force of the upper die-block is directly through the major part of head and ends of the bars, lapping on each side thereof. After the article has been sufficiently hammered or swaged in this direction it is then taken from the dies G G and placed in the dies H H, in which position the article is again hammered and compressed in a direction at right angles, or nearly so, to the first swaging. When the article is in the dies H with the head is in the cavity $e\ e'$ and the bars in the concaves $f\ f'$ and $g\ g'$ on each side of the cavity $e\ e'$, Fig. 2. The article is thus hammered and swaged into form between the dies H H when in the position seen in Fig. 3, after being subject to the action of the dies G G, when placed between them, as shown in Fig. 4. In this way the process of welding the four pieces comprising the two heads and bars together is attained by two operations without scarfing any of the parts, which cannot be done in the usual way, as the head-piece requires scarfing, and also the bars, as indicated at h, Fig. 6. After one end or head of the turn-buckle is completed by the dies the other end or head is welded to the bars in the same way as the first mode described.

Figs. 3 and 4 show one end or head of the turn-buckle. Both ends are alike and connected by the side bars, B B. The heads may be made with or without an eye by means of the dies, as the eye is formed by passing a mandrel through the central portion of the head, in first bending it over a mandrel, as before stated, and then welding the parts together between the dies with the mandrel in place. The head may be roughed out solid and welded to the bars in the dies without a mandrel, in which case the eye for the swivel, bolt, screw, &c., would have to be drilled out or otherwise formed for the swivel, bolt, screw, &c., as may be required. The mandrel is passed through the central portion or opening, I, in the dies, as indicated by the dotted lines I', Fig. 1, and surrounded by the head A therein while being swaged. The crude turn-buckle is moved alternately from one pair of dies to the other for the completion of the work. The blocks and dies herein referred to as "upper" and "lower" are, however, alike and in pairs. The dies in the upper block, C, are essentially the same as in the lower block, D. The blocks C D contain two pairs of dies, G G, H H, which may be used in two blocks, C D, or so divided or separated that the dies H H can be in two blocks, and the dies G G also in two blocks separate from the dies H H, and operating separately apart from each other. The blocks thus operating with their respective dies in welding and swaging the heads and bars together will produce the same results as when the blocks are united with the dies, as shown. In case of two sets of blocks, with their respective dies, one pair of dies may only be used, with hand-tools for the work; but it could not be as readily and as well done as with both sets of dies.

In using the dies the head may be either solid or hollow, having an eye formed therein by means of a mandrel, and the bars may be welded to the head as well one way as the other, the essential features of the dies being that they are so formed and arranged as to make the turn-buckle without or with an eye, as hereinbefore described.

What I claim as my improvement, and desire to secure by Letters Patent, is—

1. In mechanism for making turn-buckles, the dies G G, having a cavity for the head of the article, with a recess on two sides for the reception of the bars or links, constructed and arranged to operate conjointly for welding the head and bars together by the action of the dies, substantially as set forth.

2. The pair of dies H H, provided with a cavity for the head of the article, with a concave on each side of the cavity and extending therefrom to receive the bars B B, constructed and arranged as shown, to co-operate conjointly in welding and forging the head and bars of turn-buckles together, substantially as described.

3. In dies for forging turn-buckles, the pair of dies G G, formed to receive the head and bars of the article, arranged to operate jointly with the dies H H, shaped with a cavity for the head, concaves for the bars at the sides for welding the head and bars together and swaging the same at one continuous operation, substantially as herein set forth.

In testimony whereof I affix my signature in presence of two witnesses.

WILLIAM WARD.

Witnesses:
GUSTAV COLD,
J. H. BURRIDGE.